United States Patent [19]
Yamamoto et al.

[11] Patent Number: 6,078,552
[45] Date of Patent: Jun. 20, 2000

[54] OPTICAL INFORMATION RECORDING DEVICE, OPTICAL PLAYBACK DEVICE AND OPTICAL INFORMATION RECORDING MEDIUM

[75] Inventors: Masanobu Yamamoto; Seiji Kobayashi, both of Kanagawa; Koji Fujimiya, Tokyo, all of Japan

[73] Assignee: Sony Corporation, Tokyo, Japan

[21] Appl. No.: 09/034,994

[22] Filed: Mar. 5, 1998

[30] Foreign Application Priority Data

Mar. 21, 1997 [JP] Japan .................................. 9-067843

[51] Int. Cl.7 .................................................... G11B 7/00
[52] U.S. Cl. .................................. 369/54; 369/58; 369/47
[58] Field of Search ................................ 369/47, 48, 49, 369/50, 54, 58, 59, 116

[56] References Cited

U.S. PATENT DOCUMENTS

| | | | |
|---|---|---|---|
| 5,541,904 | 7/1996 | Fite et al. | 369/58 |
| 5,805,551 | 9/1998 | Oshima et al. | 369/59 |

*Primary Examiner*—Muhammad Edun
*Attorney, Agent, or Firm*—Jay H. Maioli

[57] ABSTRACT

An optical recording device, an optical playback device and an optical recording medium for recording optical information are configured to effectively prevent illegal copying by controlling laser beam irradiation timing and laser beam intensity to record main data based on the length of pits or marks formed and to record identification data based on pit width.

14 Claims, 13 Drawing Sheets

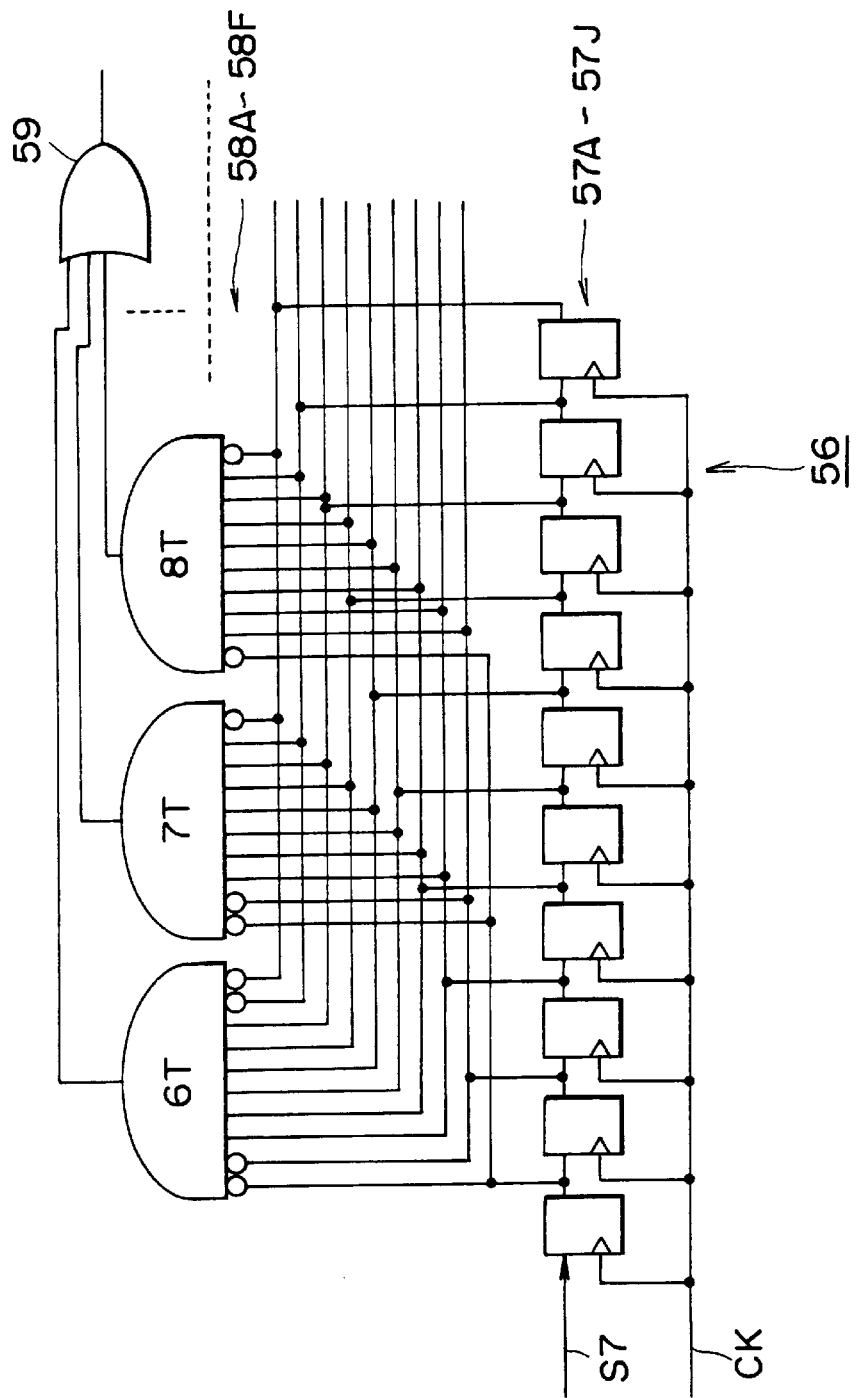
F I G. 14

COMPACT DISK

BAR CODE SHAPED PATTERN

OPTICAL INFORMATION RECORDING DEVICE, OPTICAL PLAYBACK DEVICE AND OPTICAL INFORMATION RECORDING MEDIUM

BACKGROUND OF THE INVENTION

1. Field of the Invention

This invention relates to an optical information recording device, optical information playback device, and optical information recording medium such as for use with compact disks and their recording units and playback units. This invention regulates the timing and intensity of the laser beam, records the main data by means of the pit and mark length and intervals and effectively prevents illegal copying by recording identification data by means of the width of the pits and marks.

2. Description of Related Art

Conventionally, as for instance in the compact disk which is one type of optical information recording medium, after data processing of the data accompanying the recording, EFM (Eight-to-Fourteen) modulation is performed against the fundamental period T, a row of bits for a period 3T to 11T are formed, and by this process the audio data recorded.

In contrast, in compact disk players, a laser beam is irradiated upon a compact disk and the returning light received, a playback signal is obtained whose signal level is altered according to the intensity of this returning light, and a binarizing signal generated by binarizing of this playback signal to a specified slice level. Further, a PLL (phase lock loop) circuit is driven by this binarizing signal and a playback clock pulse generated. The binarizing signal is sequentially latched by this playback clock pulse and this process generates playback data at a period of 3T to 11T corresponding to the pit row formed on the compact disk.

The playback data, generated in this way in the compact disk player is decoded by data processing corresponding to the data processing during recording, and playback such as of audio data recorded in the compact disk can be performed.

Such kind of compact disks have information such as the manufacturer's name, manufacturing location, and disk number stamped on a zone on the inner side of the lead-in area on which data cannot be recorded. This stamped information allows visual identification as to whether the compact disk is being used for illegal copying.

However illegal copying generally consists of two types. In one type, a stamper is manufactured from audio data obtained by playback of a genuine compact disk and the copy of the compact disk then made. In the other type, a physical copy is made of the pit shape formed on the genuine optical disk.

In these two types of illegal copying, identifying an illegal copy is difficult when even the stamp itself has been copied. Further, even without this stamp the audio data can be played back so preventing this type of illegal copying is extremely difficult.

SUMMARY OF THE INVENTION

In view of the above problems, it is therefore an object of this invention to provide an optical recording device, optical playback device and optical information recording medium that effectively prevents illegal copying.

In order to solve the above problems and achieve the object of this invention, a modulated signal is generated whose signal level changes by means of a period that is a multiple of a specified fundamental period based on the main data. Bits and marks are formed on the recording medium by means of this modulated signal and the laser beam intensity is switched according to the secondary data which forms the identification data at this time.

To also achieve the above objects, this invention as suitable for use in an optical information playback device, plays back the main playback data corresponding to the size of a play signal based on a specified threshold value; and also plays back secondary playback data corresponding to amplitude modulated values of said playback signal, and stops processing of said main playback data based on the secondary playback data.

As a still further means to achieve the above objects of the invention, in an optical information recording medium, the main data is recorded by means of pit and mark length and related gaps on the recording surface and secondary data is recorded by means of pit or mark width and this secondary data forms the identification data.

If the laser beam intensity is switched according to the secondary data, the main data is recorded in lengths or gaps of the pits or marks and the secondary data can also be recorded by utilizing the width of the pits or marks. If a physical copy is however attempted for instance of the pit shape, then making a correct copy of the pit width will be difficult which in turn makes correct playback of the main and secondary data difficult. Accordingly, the identification data is assigned to the secondary data and by using this secondary data as a reference, playback of the copy can be excluded from the recording medium. Another method is simply to make copying of the secondary data difficult by means of a record device that records data by means of bit length and intervals so that attempting to make copies with a device which copies secondary data is also prevented and such copies cannot be played back.

Accordingly, this invention as suitable for use in an optical information playback device, is able to prevent illegal copying by playing back the main playback data corresponding to the size of a play signal based on a specified threshold value; and also by playing back secondary playback data corresponding to amplitude modulated values of said playback signal, and to stop processing of said main playback data based on the secondary playback data.

By therefore recording the main data in pits or mark length and intervals on the optical information recording medium, and recording secondary data in the pit and mark width, illegal copying can effectively be prevented.

BRIEF DESCRIPTION OF THE DRAWINGS

FIG. 14 is a block diagram showing the pit detector circuit of the discriminator code detector of the compact disk player in FIG. 13.

DETAILED DESCRIPTION OF THE PREFERRED EMBODIMENTS

The present invention will next be described in detail while referring to the accompanying drawings.

Figure 1:
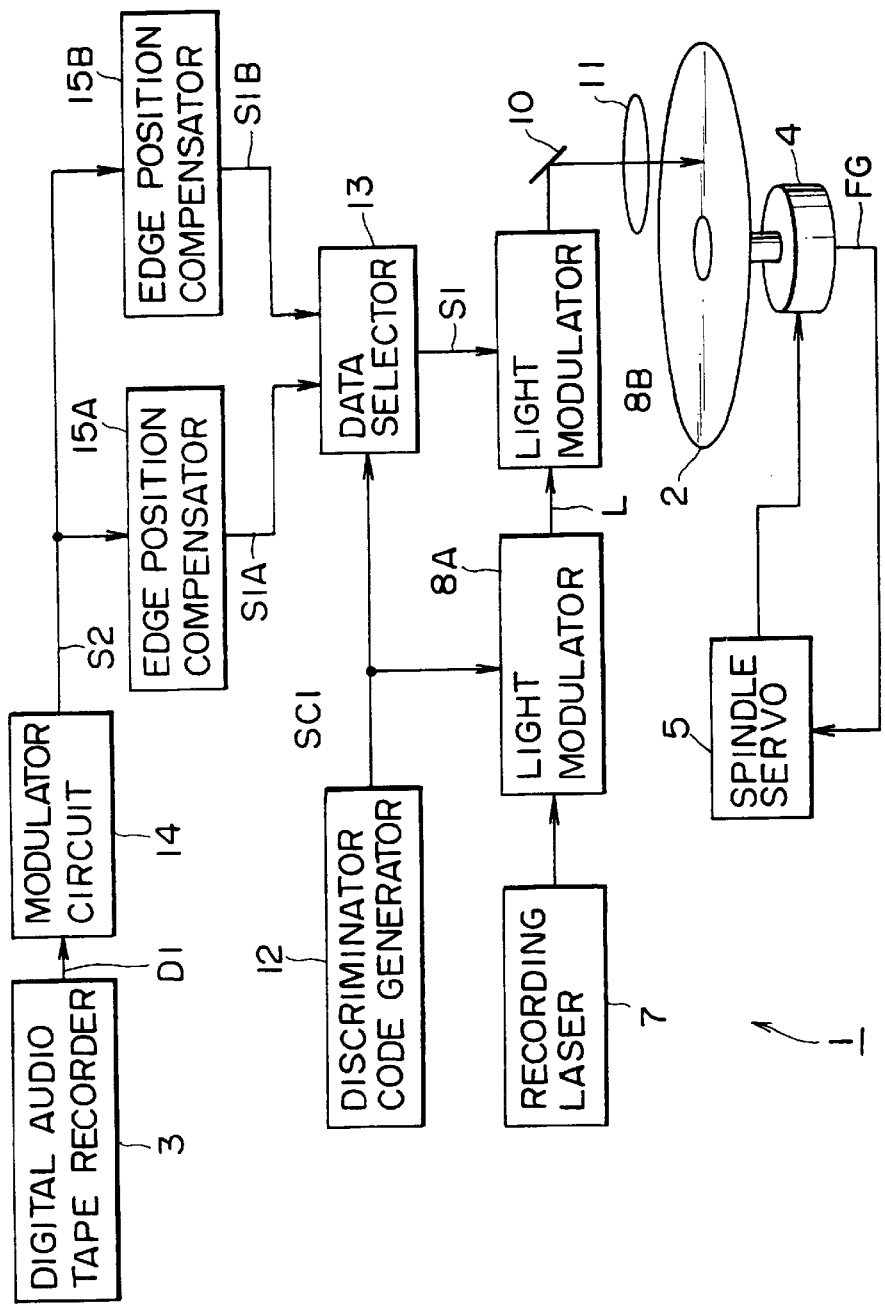
FIG. 1 is a block diagram showing the optical disk device relating to the embodiment of this invention.

FIG. 1 is a block diagram showing the optical disk device relating to the embodiment of this invention. In an optical disk device 1, a disk base 2 is exposed to light and a digital audio tape recorder 3 records the audio data D1 that is output and records the secondary data necessary for processing of this audio data D1. In the manufacturing process for the optical disk, once the disk base 2 has been developed, a mother disk is created by an electroforming process and a mother disk stamper then fabricated. Also, within this optical disk manufacturing process, a disk-shaped plate made from a stamper as described above, is fabricated. A reflective layer and a protective layer are formed on this disk-shaped plate and a compact disk thus produced.

More specifically, in the optical disk device 1, a spindle motor 4 drives the disk base 2 and an FG signal generator circuit mounted at the bottom below the disk base 2, issues a rise pulse FG signal FG at each specified rotation angle. A spindle servo 5 drives the spindle motor 4 according to the position exposed to light on the disk base 2 so that the period of the FG signal FG will maintain a specified period. This process allows the disk base 2 to be driven at a linear fixed speed.

A recording laser 7 may be a gas laser or another type of laser. The recording laser 7 irradiates the disk base with a laser beam L. An optical modulator 8a comprised of an electrical acoustic optical element, switches the light intensity of the laser beam L according to a control signal SC1. The optical modulator 8a thus modulates the light intensity of the laser beam L in response to the control signal SC1.

An optical modulator 8b comprised of an electrical acoustic optical element performs on/off control of the laser beam L by means of a modulation signal S1 and outputs said laser beam. A mirror 10, refracts the light path of the laser beam L and directs the laser beam at the disk base 2. An objective lens 11 concentrates the light reflected from the mirror 10 onto the disk base 2. This mirror 10 and the objective lens 11 are synchronized with the rotation of the disk base 2 and move sequentially to the outer circumference of the disk base 2. This arrangement therefore allows the light exposure position of the laser beam L to gradually be shifted towards the outer circumference of the disk base 2.

In the optical disk device 1, the disk base 2 is rotated and the mirror 10 and objective lens 11 move to form a spiral track, and a pit is gradually formed on this track matching the modulation signal S1. The pit width is also varied at this time, by means of the control signal SC1.

A discriminator code generator 12 generates identification data for identifying compact disks made by the optical disk device 1, and the signal level of the control signal SC1 is switched according to this discriminator data. The discriminator code generator 12 therefore intermittently lowers the laser beam light intensity output from the optical modulator 8A, from 100 percent to 85 percent, and the width of the pit formed on the disk base 2 is varied in response to the discriminator data.

A modulator circuit 14 receives the audio data D1 output from the digital audio tape recorder 3 and adds corresponding sub code data to this audio data D1. This modulator circuit 14 also processes the audio data D1 and the sub code data into a format for the compact disk and generates a modulation signal S2. In other words, after the modulator circuit 14 adds an error correction code to the audio data D1 and sub code data, the modulator circuit then performs interleaving and EFM modulation processing. This arrangement therefore allows the modulator circuit 14 to vary the signal level to a multiple (3T to 11T) of the fundamental period T for forming the pit, and issue an EFM modulated signal S2.

The edge position compensators 15A and 15B detect the varying pattern of the EFM modulated signal S2 and correct the timing of the EFM modulated signal S2 so that interference between or within codes is reduced during playback in response to the varying signal pattern, and then output as modulation signals S1A and S1B which are the results of the timing corrections. The edge position compensator 15A at this time outputs the modulation signal S1A corresponding to a laser beam L intensity of 100 percent output from the optical modulator 8A; and the edge position compensator 15B outputs the modulation signal S1B corresponding to a laser beam L intensity of 85 percent output from the optical modulator 8A.

Figure 2:
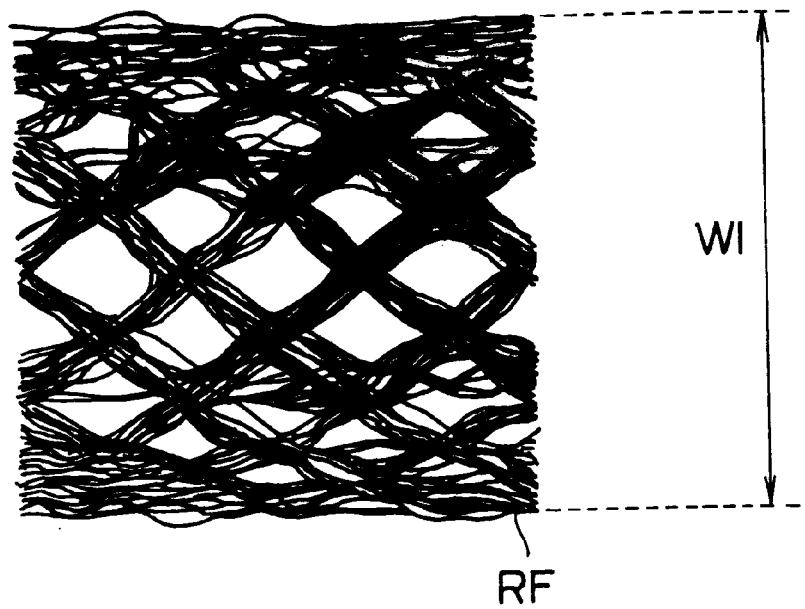
FIG. 2 is a signal waveform showing the playback signal at a laser beam light intensity of 100 percent.
Figure 3:
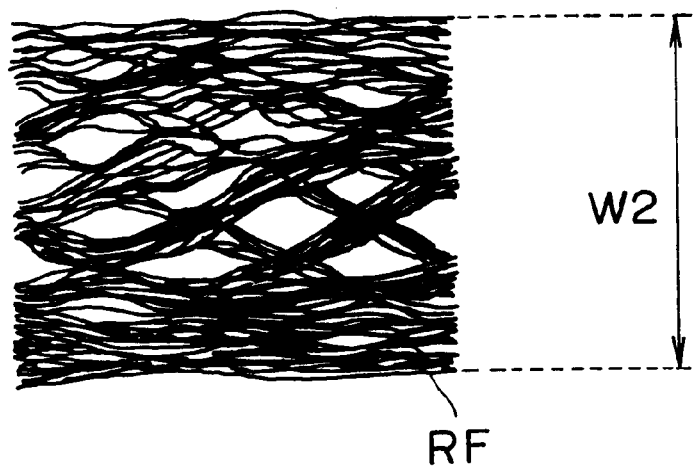
FIG. 3 is a signal waveform showing the playback signal at a laser beam light intensity of 85 percent.

In other words, when the pit width is changed by switching the laser beam L intensity from 100 percent to 85 percent, the signal level of the playback signal is also changed by a corresponding amount. More specifically, for light intensities of respectively 100 and 85 percent, the playback signal amplitudes W1 and W2 are varied as shown in FIGS. 2 and 3 by the visual turn for the playback RF signal.

Figure 4:
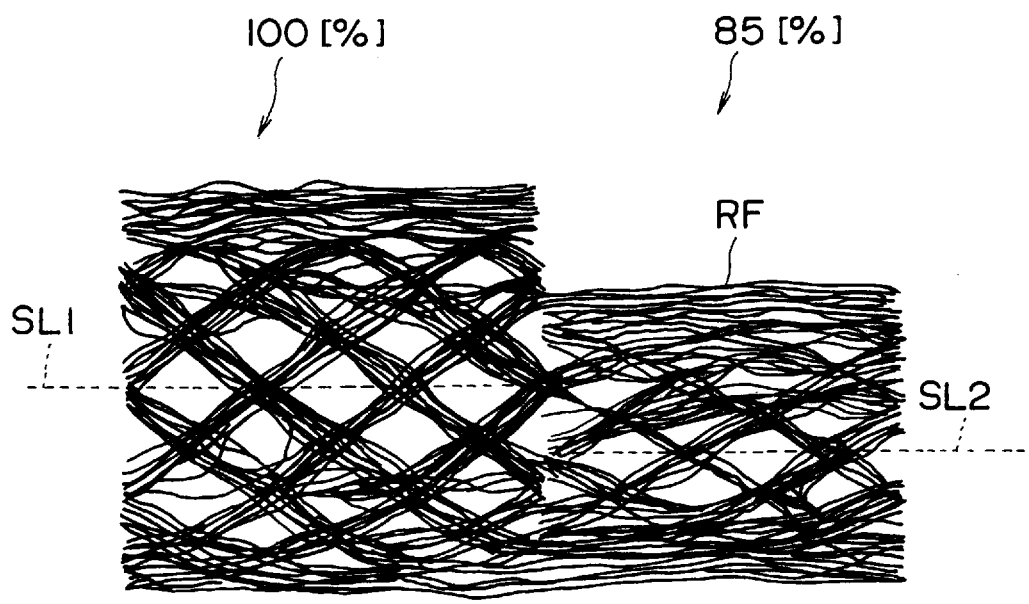
FIG. 4 is a signal waveform showing variations in the slice signal level due to differences in the light intensity.

Upon observing the continuous waveform, as shown in FIG. 4, a difference or gap can be seen to occur from when the SL1 and SL2 slice levels for binarizing the playback signal are subject to the 100 percent light intensity and when SL1 and SL2 are subject to 85 percent light intensity. In other words, a large asymmetrical variation occurs between the portion at a light intensity of 100 percent and the portion at a light intensity of 85 percent. Thus when binarizing the playback RF signal with a fixed slice level SL1 when light intensity is 100 percent, generation of a binarizing signal at the correct timing (in other words the timing for synchronizing with the fundamental period T) is difficult. In addition, a large jitter is generated in the playback clock which makes it difficult to play back the audio data that was recorded on the compact disk. Further, when a playback signal light intensity of 85 percent, is sliced by a slice level SL1 set for a light intensity of 100 percent, and for instance when the amplitude of the playback signal is small such as for a playback signal for a period 3T, then the binarizing signal for slice level SL1 itself becomes a block. So that not only does the jitter become larger but bit errors often occur in the playback data due to this binarizing signal.

Though the typical compact disk player is provided with an automatic slice level compensation circuit to allow the slice level to be compensated for such changes in asymmetry, this compensation circuit cannot handle sudden optical variations and an extremely long burst error occurs in the portion right after the laser beam L has been switched.

Figure 5:
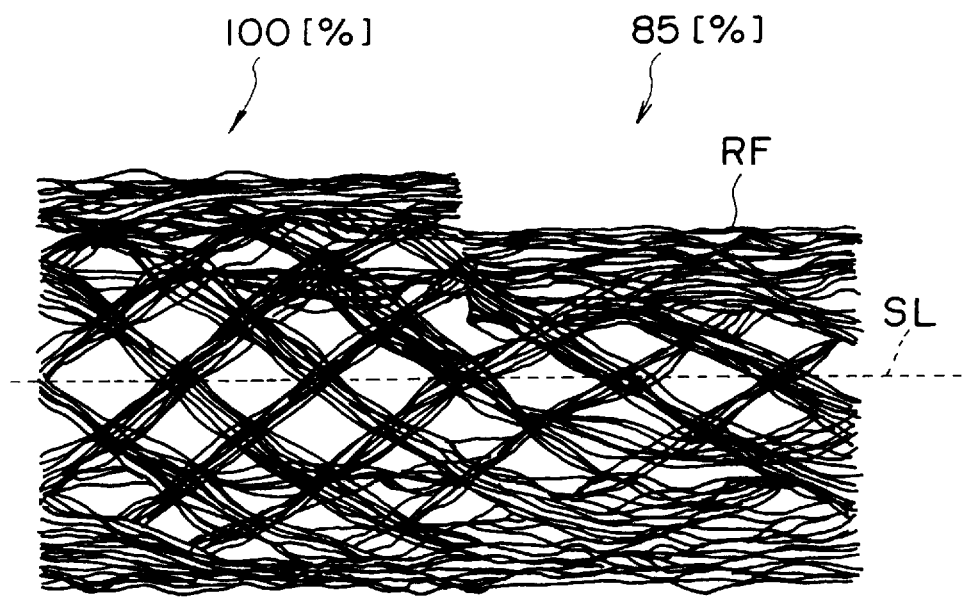
FIG. 5 is a signal waveform showing the playback signal of the compact disk produced by the optical disk device in FIG. 1 compared to the waveform of FIG. 4.

Therefore, in the optical disk device 1, the edge position compensators 15A and 15B correct the bit length formed on the disk base 2 and as shown in FIG. 5, perform binarizing of the RF playback signals of respectively 100 percent and 85 percent to the same slice level and output modulation signals S1A and S1B to correct the timing of modulation signal S2 so that a binarizing signal with the correct timing is generated.

Also at this time, the respective varying patterns variations of the EFM modulation signal S2 are detected and based on these varying patterns the modulation signals S1A and S1B are output in order to reduce code interference from and between adjacent codes.

In other words, if the light intensity of the laser beam L is varied, the pit width will vary so that the interference between codes will vary relative to the different light intensities. The edge position compensators 15A and 15B utilize this fact to correct the modulation signal S2 timing so that RF playback signal jitter due to interference between codes is reduced per different light intensities.

Based on the control signal SC1 output from the discriminator code generator 12, a data selector 13 selects and outputs a modulation signal S1A and S1B that matches the switching of the laser beam L intensity.

Figure 6:
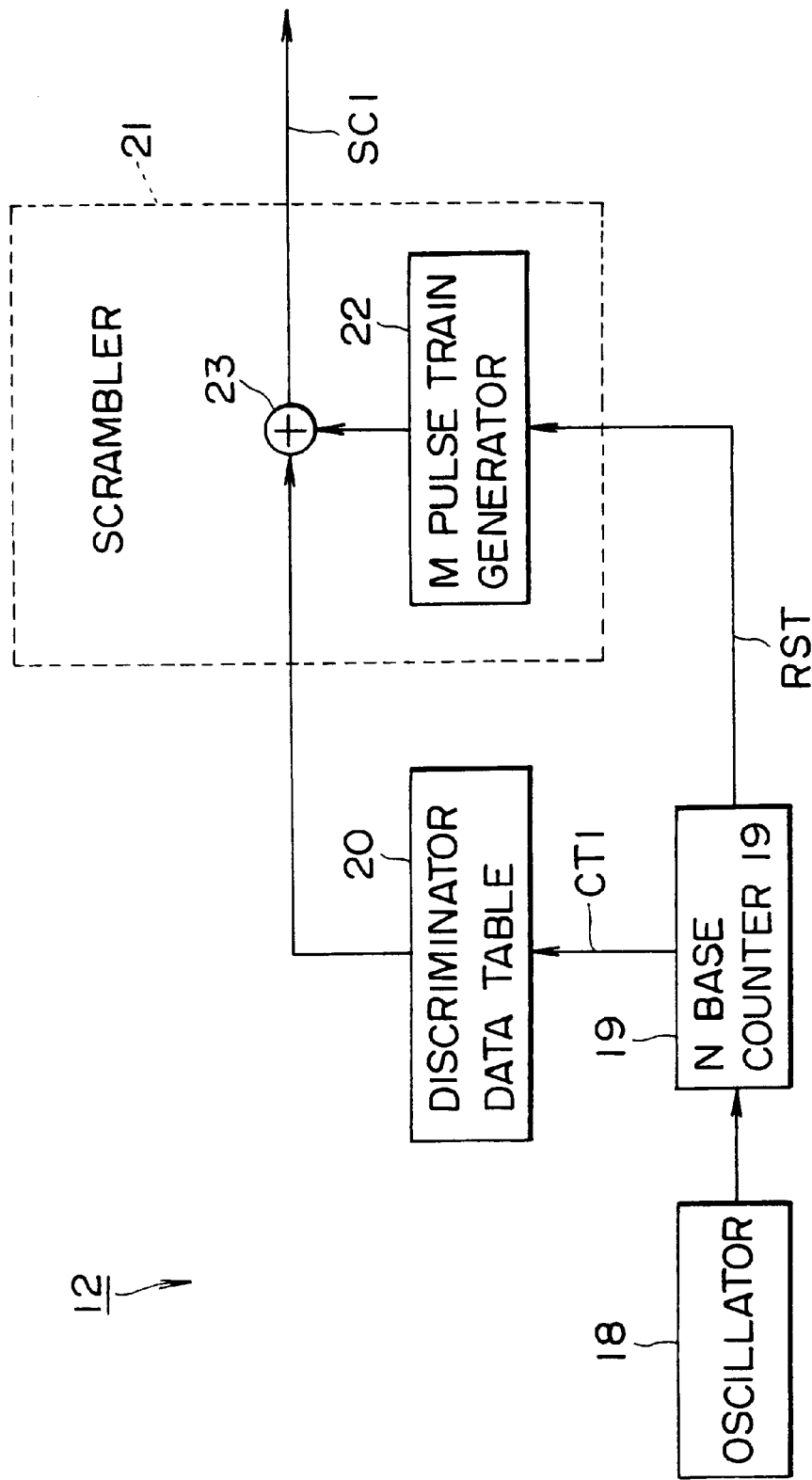
FIG. 6 is a block diagram showing the discriminator code generator of the optical disk device of FIG. 1.

FIG. 6 is a block diagram showing the discriminator code generator 12. In this discriminator code generator 12, an oscillator 18 has a sufficiently long period compared to the pit forming period (hundreds to thousands of pit period) and generates a discriminator code clock pulse to change the signal level. The N base counter 19 is a ring counter for this discriminator code clock pulse and outputs a count value CT1. When this count has completed a reset signal RST is output.

A discriminator table 20 is comprised of a Read Only memory circuit for holding the bit information, and inputs the count value CT1 at the address input and the data that was held is then output. This process allows the discriminator table 20 to sequentially output and circulate a fixed pattern of information used as a synchronizing signal, for utilization as bit information, ID information to be recorded on the disk base 2, or production factory information, etc.

The scrambler 21 inputs the data from the discriminator table 20 into an adder 23 comprised of an exclusive OR circuit and then an M pulse train generator 22 outputs the data encoded as an M pulse train code. Here, the M pulse train generator 22 is comprised of a plurality of flipflops and exclusive OR circuits and the M pulse train code is reset based on a reset signal RST. Thus, the scrambler 21 outputs a control signal SC1 that sequentially changes the bit values corresponding to the bit information sequentially output from the discriminator table 20. The M pulse train generator 22 halts the output of M pulse train code for a specified interval after the reset signal RST is output. In this way, the synchronized portion of the bit information from the discriminator data table 20 is not subjected to scramble processing.

Thus, in the optical disk device 1, by the switching of the laser beam L from a light intensity of 100 percent to a light intensity of 85 percent according to the control signal SC1; and by the pit width of the compact disk; the ID information encoded into an M pulse train code is recorded along with a synchronizing signal.

Figure 7:
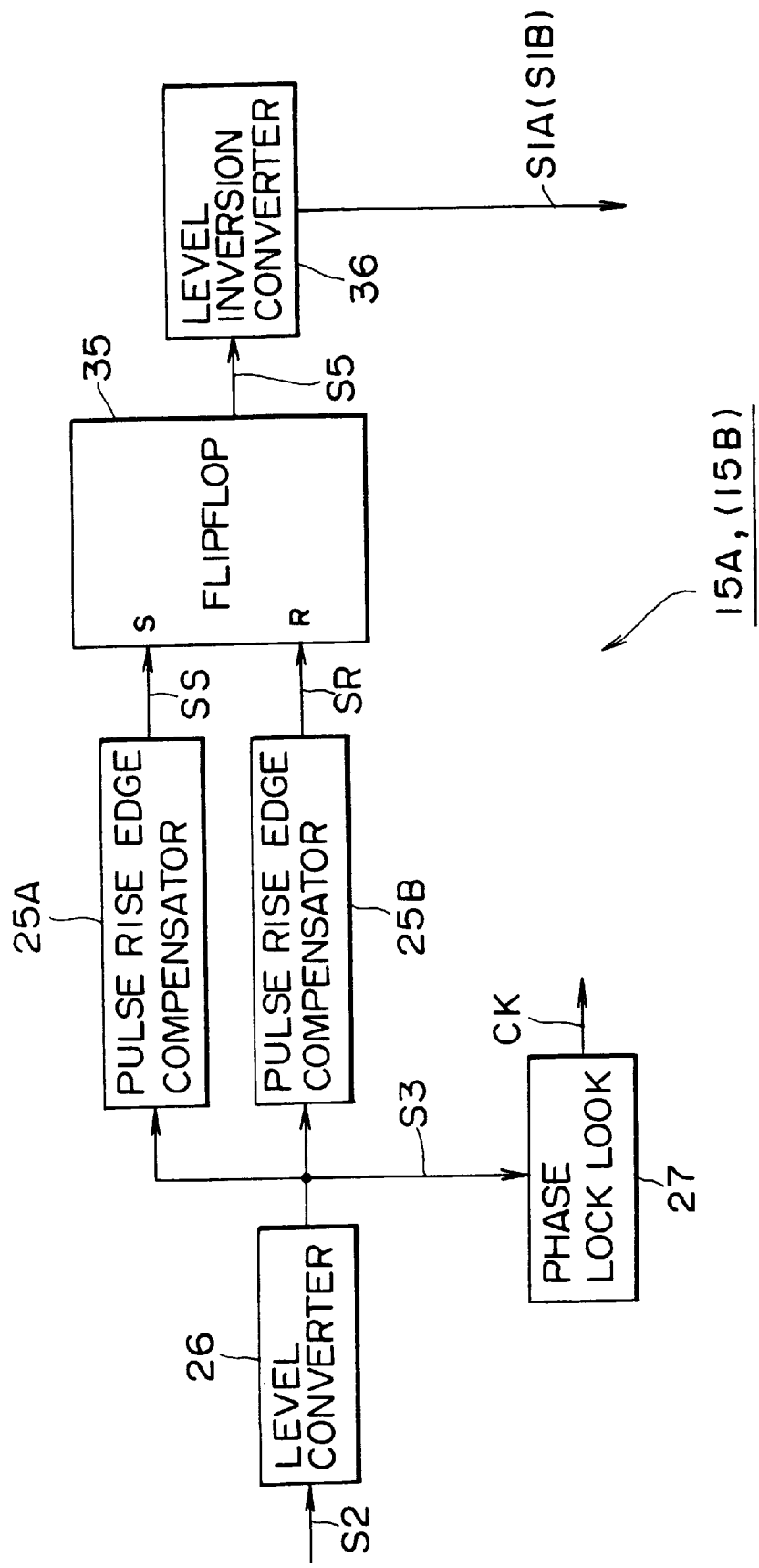
FIG. 7 is a block diagram showing the edge position compensator of the optical disk device of FIG. 1.

FIG. 7 is a block diagram showing the edge position compensator 15A. The edge position compensator 15B, aside from containing pulse rise edge compensators 25A and 25B is identical to the edge position compensator 15A and is therefore omitted from the figure.

In the edge position compensator 15A, a level converter 26 converts the output amplitude 1 [V] of the EFM modulated S2 signal level to an output amplitude of 5 [V] TTL level. A PLL circuit 27 generates a clock CK (FIG. 8B) pulse from the modulated signal S3 (FIG. 8A) output from the level converter 26. Therefore, by varying the signal level of the period which is several times that of the fundamental period T, the PLL circuit 27 generates a clock CK pulse whose signal level varies with the basic period T synchronized with this modulation signal S2.

Figure 9:
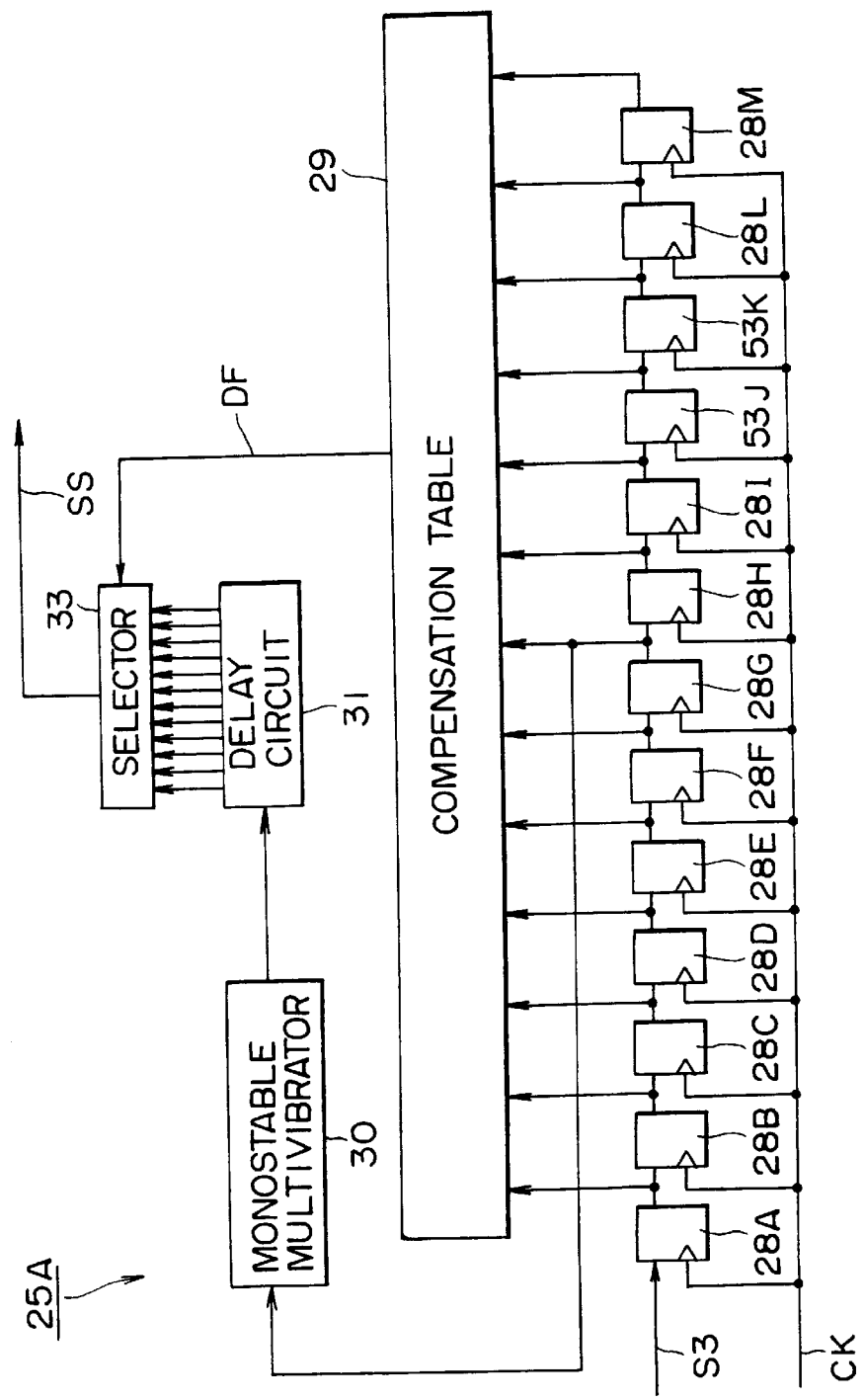
FIG. 9 is a block diagram showing the rising edge compensator circuit in the edge compensator circuit of FIG. 7.

In the pulse rise edge compensator 25A as shown in FIG. 9, the clock CK pulse drives 13 serially connected latch circuits 28A–28M and the output signal S3 from the level converter circuit 26. This arrangement allows the output signal S3 of the pulse rise edge compensator 25A to sample the latches by using the clock CK timing and to detect the varying patter of the modulation signal S2 by means of the sampling results of 13 points on the latches. In other words, if for instance a latch output of "0001111000001" is obtained, then this can be determined to be continuous varying pattern of a space with a length of 5T followed by a pit with a length of 4T. Similarly, if for instance a latch output of "0011111000001" is obtained, then this can be determined to be a varying pattern of a space of 5T followed by a pit length of 5T.

A compensation table 29 is formed of a Read Only memory storing a plurality of correction data and sets an address at the latch circuit outputs 28A–28M, and outputs compensation data DF corresponding to the varying pattern of the modulation signal S3. A monostable vibrator (MM) 30 receives the latch outputs from a latch circuit 28G in the center of the serially connected 13 latches and based on the pulse rise timing of this latch output, outputs a rising pulse signal for a specified interval (sufficiently shorter than the period 3T).

A delay circuit 31 has a 12 stage 13 output tap. The difference in the delay time between each tap is set for correcting the timing of the modulation signal in the edge position compensator 15A. The delay circuit 31 sequentially delays the rise pulse signal output from the monostable multivibrator 30 and issues an output from each tap. The selector 33 selects the tap output from the delay circuit 31 according to the compensation data DF and the rising reverse pulse signal SS (FIG. 8D) which varies according to the delay time according to the compensation data D is thus selected and output.

The above process allows the signal level of the pulse rise edge compensator 25A to rise to match the rise of the modulation signal S2 signal level and further allows the leading edge delay time Δr (3,3), Δr (4,3), Δr (3,4), Δr (5,3), etc., for the modulation signal S2, to generate the leading edge rise signal SS that varies according to the varying pattern of the modulation signal S2.

Figure 8:
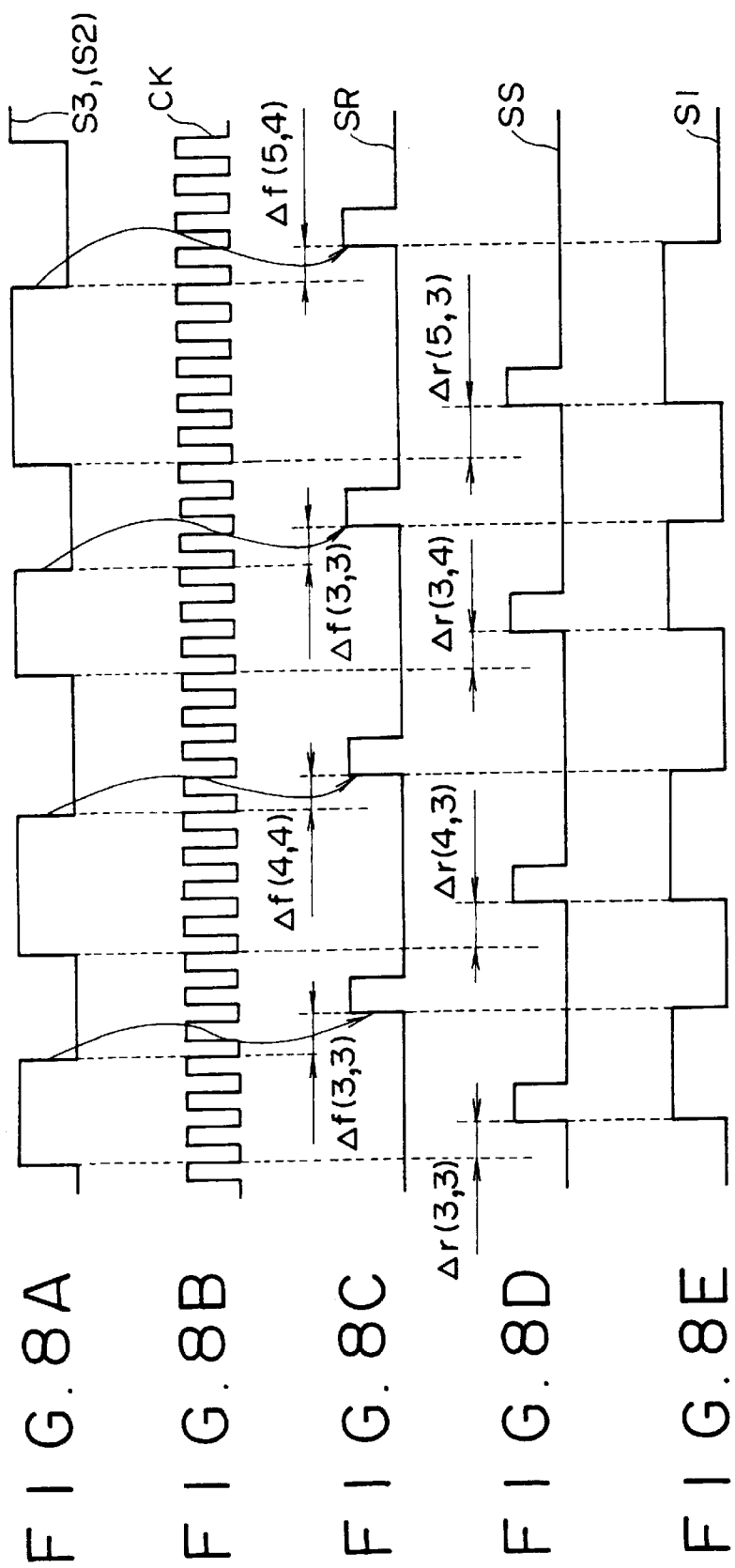
FIGS. 8A through 8E are signal waveforms respectively showing the timing and operation of the edge position compensator circuit of FIG. 7.

In the varying pattern for the modulation signal S2 in this FIG. 8, one period of the clock (in other words, the channel clock) CK is expressed as pit length units p and pit intervals b and the delay time for the leading edge is shown as Δr (p, b). Accordingly, in FIG. 8D, the second listed delay time Δr (4,3) is the delay time when a 3 clock blank is prior to a length 4 clock pit. Therefore, all the compensation data DF is stored in the compensation table 29 and correspond to all combinations of these p's and d's. In this way, when the laser beam L forms the pits with the laser beam according to the modulation signal S2, the pulse rise edge compensator 25A detects the pattern of the pit formed on the optical disk in units of base period T within a range of 12T and generates the leading edge rise signal SS that varies according to this pattern.

In the pulse fall edge compensator 25B, the monostable multivibrator 30 operates based on the falling edge of the pulse output from the latch and excluding the fact that the contents of the compensation table 29 are different, is identical to the pulse rise edge compensator 25A.

This process allows the signal level of the pulse fall edge compensator 25B to rise corresponding to the fall of the signal level of the modulation signal S2 and further allows the leading edge delay time Δf (3,3), Δf (4.4), Δf (3,3), Δf (5,4), etc., for the modulation signal S2, to generate a falling edge signal SR (FIG. 8C) that varies according to the varying pattern of the modulation signal S2. In this FIG. 8, just as with the delay time for the rising edge pulse, the delay time for the falling edge pulse are shown with Δf (p, b) where p is the pit length and b is the bit interval.

In this way, when the laser beam L forms the pits with the laser beam according to the modulation signal S2, the pulse fall edge compensator 25B detects the pit pattern formed on the optical disk in units of base period T within a range of 12T and the fall edge timing is corrected for the modulation signal S2 which forms the end timing for irradiation by the laser beam according to this pit pattern, and a falling edge signal SR is generated.

A flipflop (F/F) 35 of FIG. 7, outputs a composite of the pulse rising edge signal SS and the falling edge signal SR. In other words, the flipflop 35 inputs the pulse rising edge signal SS and the falling edge signal SR respectively into the set terminal S and the Reset terminal R. Thus after the signal level has risen with the rise of the rising edge signal SS, a modulation signal S5 is generated with the fall of the signal level when the signal level of the falling edge signal SR rises. A level inversion converter 36 corrects the signal level of this modulation signal S5 whose output amplitude becomes TTL level and outputs this signal at its original amplitude.

The pulse rise edge timing and fall edge timing of the modulation signal S2 is thus corrected according to the approximate pit and land length, and the laser beam L timing of beam irradiation for the disk base 2 also correspondingly corrected by the approximate pit and land length.

Thus during playback in the optical disk device 1, the front and rear edge pit positions are compensated to reduce the jitter that occurs from interference within the code. Also, the edge position compensators 15A and 15B correct the front and rear edge positions corresponding to the light intensity of the respective recording beam L so that even at times when the laser beam L is being started up, the play signal is maintained at a fixed threshold value and front and rear edge pit positions compensated in order to allow reliable playback of the recorded data D1 by means of the pit length and the pit intervals.

In other words, when the laser beam intensity is 100 percent, the pulse front edge and rear edge positions of the modulation signal 1A output from the edge position compensator 15A are corrected and a correct binarizing signal at a fixed slice level can thus be generated. When the laser beam intensity is 85 percent, the pulse front edge and rear edge positions of the modulation signal 1B output from the edge position compensator 15B are corrected and a correct binarizing signal at a fixed slice level can thus be generated just as was the case when the laser beam intensity is 100 percent.

A description of the generation of the compensation table 29 used in correction of the timing explained above and a process drawing is shown in FIG. 10. By making the appropriate settings for this compensation table 29, correct timing synchronized with a clock pulse CK, delivers a playback signal with a specified slice level can be obtained even when there are variations in the intensity of the laser beam L, the bit length, and the approximate blank length.

In the compensation table 29, the edge position compensators 15A and 15B are respectively set for the pulse rise edge compensator 25A and pulse fall edge compensator 25B however except for cases where the conditions for generation are different both of said compensators use the same method so only the method using the pulse rise edge compensator 25A will be explained here.

In this process, an evaluation disk base is fabricated and the compensation table settings made, based on the playback results from the compact disk manufactured with this disk base.

In the making of this evaluation disk base, settings are made in an evaluation compensation table 29. In this evaluation compensation table 29, in the selector 33 (FIG. 9) compensation data DF is set so as to always be capable of being selected and output from the centertap of the delay circuit 31. In this process, when a modulator 8b is directly driven by with the EFM modulator signal S2 by a laser output of 100 percent, the disk base 2 is being exposed to light under the same conditions as the normal manufacturing process for a compact disk.

In this process, after exposing the disk base 2 to light and developing said disk base in this way, a stamper 40 is produced by means of the mother disk. A compact disk 41 is then fabricated in the same type process as manufacture of a typical compact disk by means of the stamper 40.

A compact disk 41 made for evaluation purposes as described above is played back in a compact disk player (CD player) 42. Operation of this compact disk player 42 is switched and controlled by a computer 44. The signal level during playback is varied by means of the light intensity of the light returning from the compact disk 41 and in internal signal processing circuit output the playback RF signal to a digital oscilloscope 45. Thus, when this RF playback signal is monitored on a digital oscilloscope, changes in the amplitude of the playback signal for the portion corresponding to the pit can be monitored due to the variations in amplitude resulting from changes in pit width that accompany the switching of the laser beam intensity.

Also, when the front edge and rear edge of the pit is changed, along with the above change in the pit width, a large jitter is observed to accompany changes in amplitude and the asymmetry also has large changes. Further, jitter also occurs due to character interference from the front and back pits even in sections where the pit was formed with a low level laser beam such as in the user area, etc.

The digital oscilloscope 45 is operated and switched as needed by the computer 44. Analog digital conversion of this playback RF signal is performed at a sampling period 20 times that of the channel clock period and the digital signal thus obtained is output to the computer.

Along with controlling the digital oscilloscope 45 operation, the computer 44 also processes the digital signal obtained from the digital oscilloscope 45 thus allowing calculation of the compensation data DF. The computer 44 also drives a ROM writer 46 and stores the now calculated compensation data DF in the read only memory. This data forms the compensation table 29. The optical disk is produced as a final result of this process by the compensation table 29.

Figure 10:
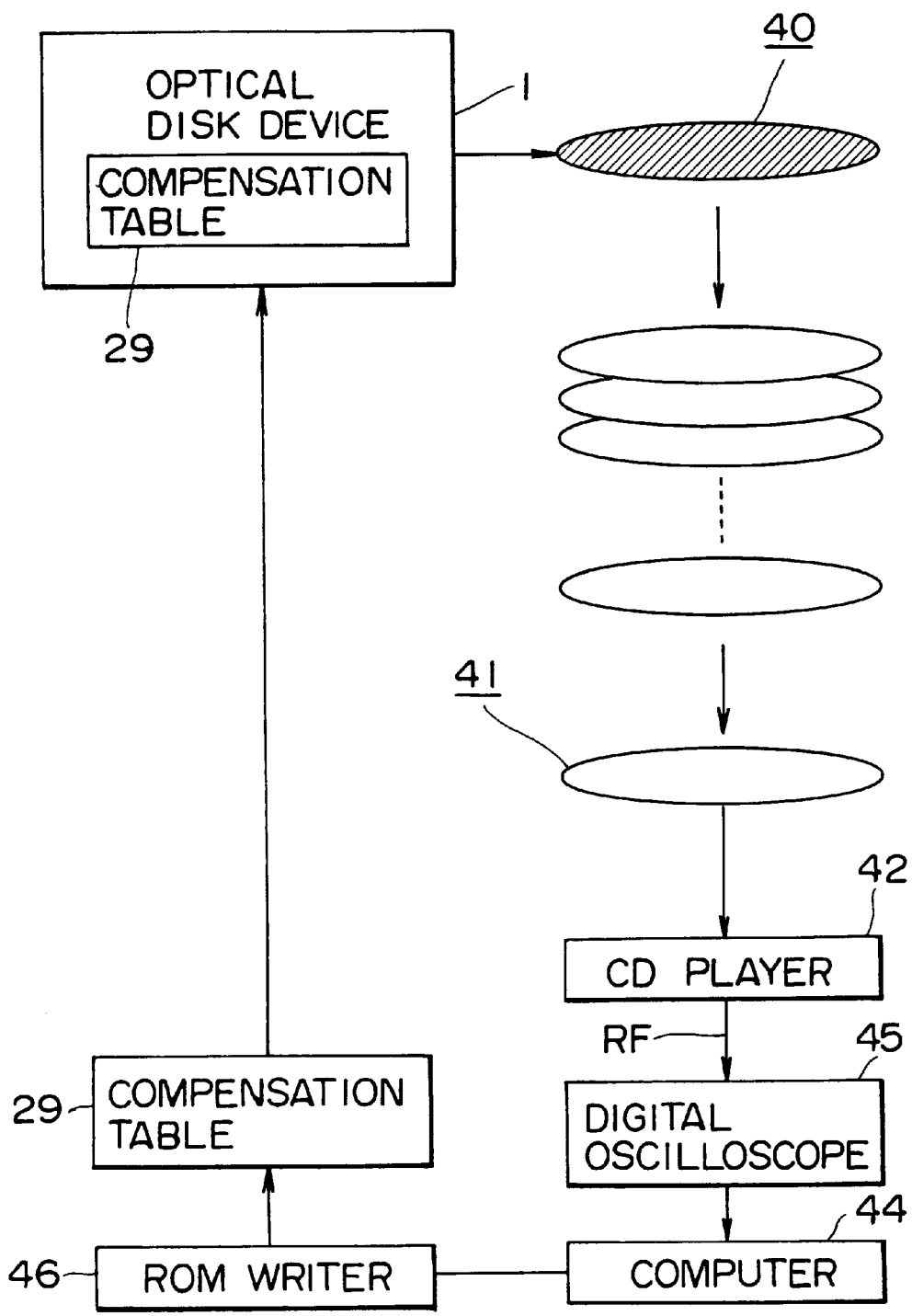
FIG. 10 is a flow process chart showing the process for making the compensation table for the optical disk device of FIG. 1.
Figure 11:
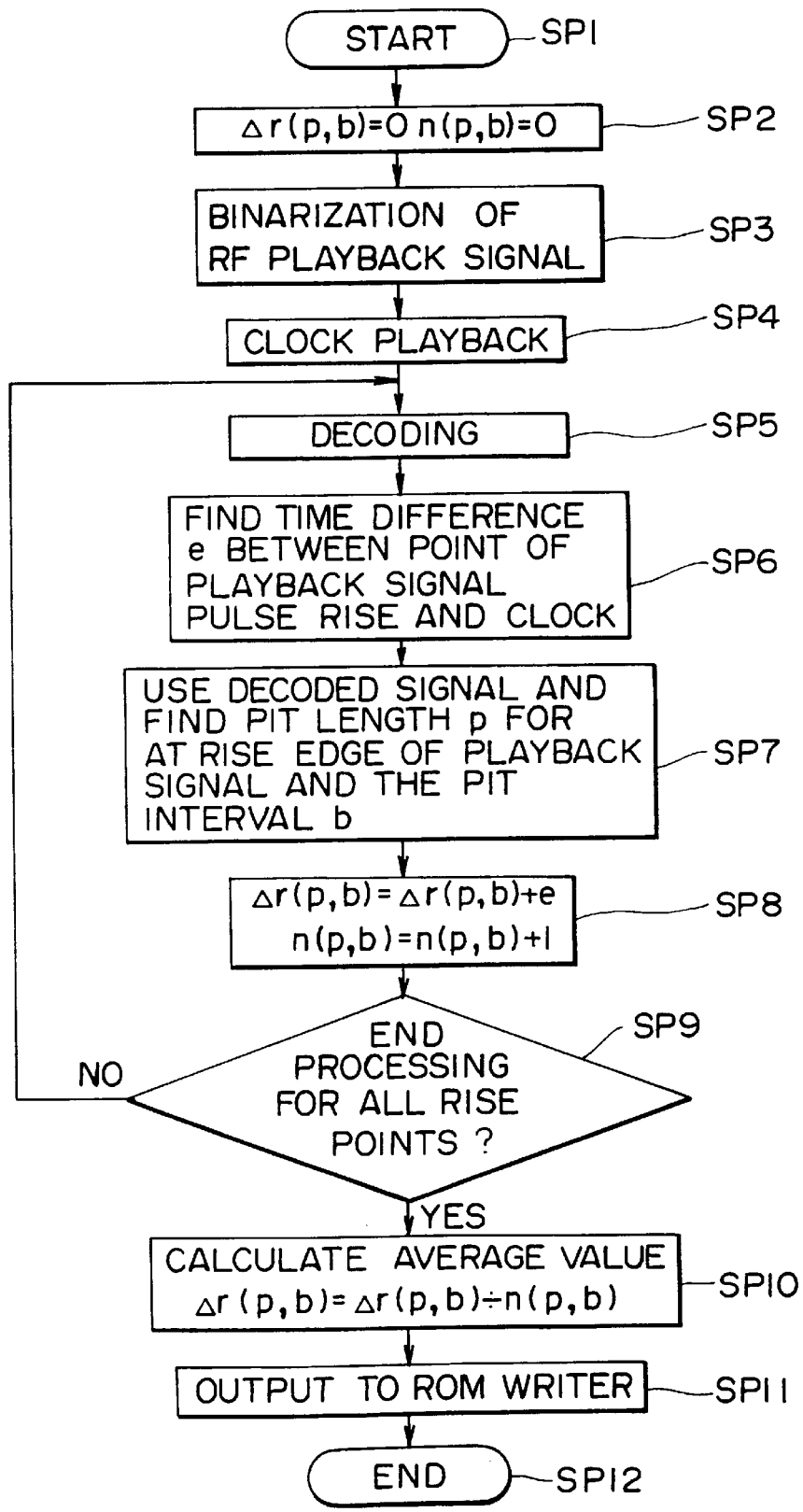
FIG. 11 is a flowchart showing the computer process sequence for the process in FIG. 10.

FIG. 10 is a flowchart showing processing procedure of the computer 44. In this procedure, the computer 44 shifts from Step SP1 to Step SP2 setting the jitter detection results Δr (p, b), and the jitter test count n (p,b) to zero (0). Here, the computer 44 detects the pit length, each combination of bit interval b, and the jitter detection results Δr (p, b) relating to jitter around the edge, and also makes a jitter test count n (p, b). The computer 44 therefore first sets all the jitter detection results Δr (p, b), and the jitter test count n (p, b) to their reset value in Step SP2.

Next, the process is shifted to Step SP3 by the computer 44 where the playback RF signal is binarized and a binary digital signal generated by comparing the digital signal output from the digital oscilloscope 45 with a specified slice level. The digital signal is binarized by the computer 44 by processing so that a value larger than the slice level is one (1) and a value lower than the slice level is zero (0).

Next, the operation moves to Step SP4 in the computer 44 in which a playback clock pulse is generated by means of the binarizing signal composed of this digital signal. A simulation of PLL circuit operation in the computer 44 is made by processing performed based on the binarizing signal and a playback clock pulse then output.

The operation then moves to Step SP5 in the computer 44 in which the binarizing signal is sampled at timing determined by the falling edge of the playback clock pulse generated in the previous step.

In computer 44, the operation next proceeds to Step SP6, where the time difference e is detected from the point of the rising edge of the binarizing signal to the falling edge of the playback clock pulse nearest this edge. This detection process allows the jitter time to be measured versus this edge. Next in computer 44, in Step SP7, the approximate pit length p and the pit interval b are detected by a demodulation signal for the time measured in Step SP6.

The operation next proceeds to Step SP8 in the computer 44, where the time difference e detected in Step SP6 is added to the jitter detection results Δr (P,b) for the approximate pit length p and the pit interval b. The corresponding jitter measurement count n (p,b) is also added here in increments of one. Next, the operation in the computer 44 shifts to Step SP9 where completion or not of time measurement for all rising edges is determined. Here, if the determined time measurement is not complete, the operation returns to Step SP5.

The computer 44 then repeats the processing in Steps SP5–SP6–SP7–SP8–SP9–SP5 and sums the total jitter detection results measured over time for each varying pattern appearing in the RF playback signal, and also counts the number of sums performed. This varying pattern is grouped into intervals of six samplings (overall, interval with period of 12T) based on the basic period T from the edge being detected for jitter; so that results will match the number of steps of latch circuits 28A 0 28M in the pulse rise edge compensator 25A.

In this way, when measurement of the jitter time of all edges is complete, the computer 44, shifts the process to Step SP10 when a positive result is obtained in Step SP9. Here, an average value is taken for the jitter detection results measured over time for each varying pattern appearing in the RF playback signal. In other words, the computer 44 takes an average value for the jitter detection results from the effects of noise per the jitter detected in Step SP6, in order to improve the jitter measurement accuracy. When the computer 44 has in this way obtained an average value for the jitter detection results, then the process proceeds to Step SP1. Based on the detection results in this step, compensation data DF is generated for each varying pattern and this compensation data DF then output to the ROM writer 46. This compensation data DF is calculated for the delay time difference between taps in the delay circuit 31 per t by means of the following formula.

$$Hr1(p, b) = \frac{-a \cdot \Delta r(p, b)}{\tau} + Hr0(p, b) \quad (1)$$

In this formula, Hr1 (p, b) is the tap for delay circuit 31 selected per the compensation data DF. Hr0 (p,b) is the initial value selected from the compensation data table DF for the tap for the delay circuit 31. In this embodiment, Hr0 (p,b) is set at a value of zero (0). The a in the formula is a constant. In this embodiment, a value for a lower than 1 is set (for example 0.7). Compensation data can thus be reliably collected even when subjected to the effects of noise, etc.

Based on the level of the playback RF signal detected by way of the digital oscilloscope 45, the computer 44 implements generation of the compensation data respectively for when the laser beam L intensity has been raised and when at normal laser beam L intensity. This allows binarizing of the RF playback signal by the normal slice level even when the laser beam L intensity has been raised, and allows generation of the compensation data DF so that a binarizing signal of the correct timing will be obtained.

When the computer 44 stores this generated compensation data DF into the ROM writer 46, the process moves to Step SP12 and the process ends. The computer 44 next implements the same process on the falling edge of the digital binarizing signal and thus completes the compensation table 29.

Figure 12:
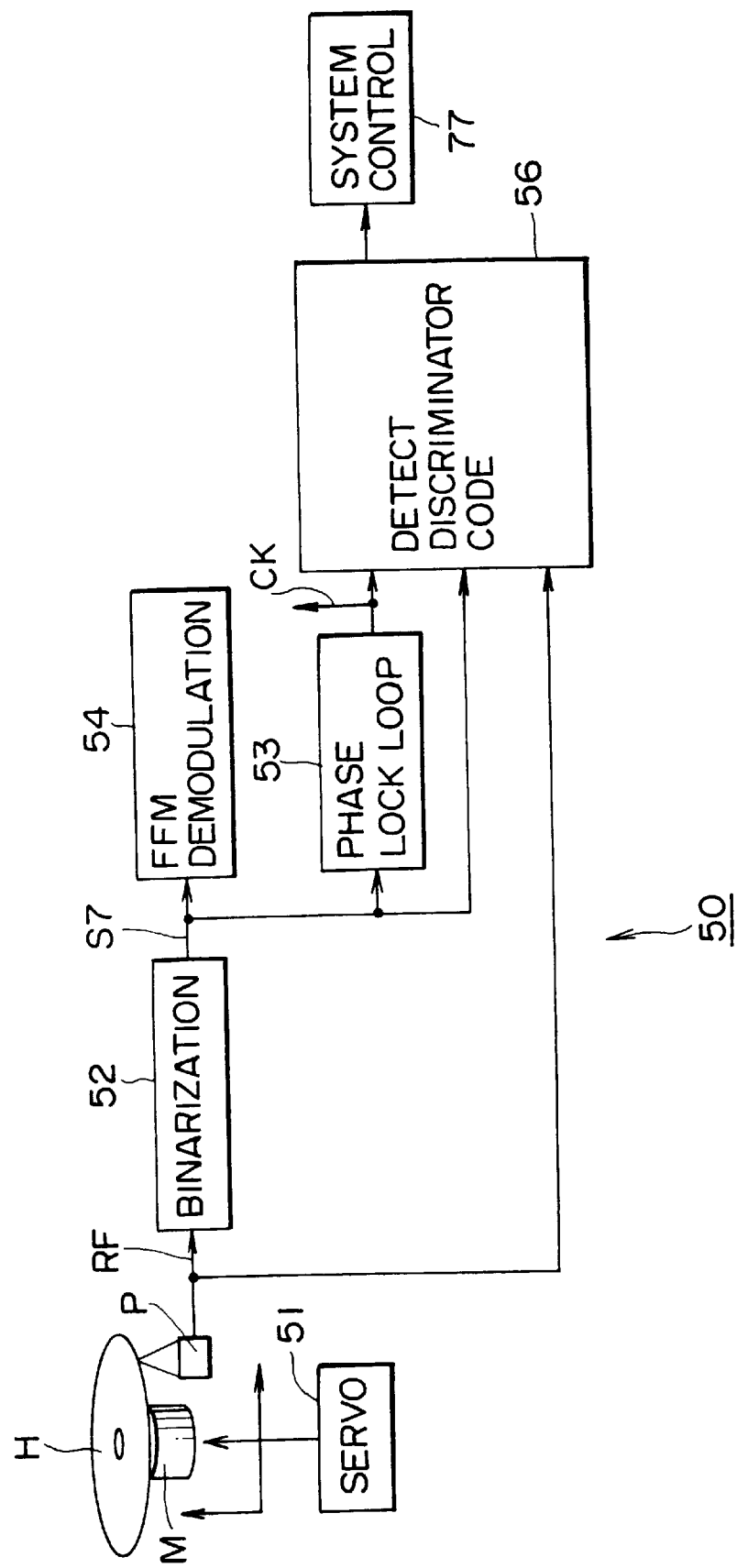
FIG. 12 is a block diagram showing the process of a playback of a compact disk in a compact disk player manufactured with the optical device of FIG. 1.

FIG. 12 is a block diagram showing the playback unit for the compact disk manufactured as described previously. This compact disk player 50 has a servo circuit 51 for spindle control via a spindle motor M and an optical pickup 9 for tracking control and focus control while a laser beam is irradiated upon a compact disk H by an optical pickup P. Further, in this compact disk player 50, the returning light from this laser beam is received by the optical pickup and a playback RF signal generated by varying the signal level according to the intensity of the returning light.

After waveform equalization of this playback RF signal, a binarizing circuit 52 identifies the signal level by means of the specified threshold and outputs a binarizing signal S7. A PLL circuit 53 generates and outputs a playback clock pulse (channel clock) CK based on this binarizing signal S7.

In the optical device 1, the timing of the laser beam irradiation is corrected according to the pattern of each type of pit shape and by correcting the timing for the front edge and rear edge of each pit, a playback RF signal with an extremely small jitter is obtained during playback. Further, the amplitude is intermittently increased by intermittently modulating the pit width per the rising intensity of the laser beam. Further, the laser beam timing is corrected according to the variations in the pit width and in this way, the front and rear edge timing for each pit is also corrected, even for the falling portions of the laser beam intensity so that playback with an asymmetry equivalent to other sections is achieved.

Thus the binarizing circuit 52 generates a binarizing signal S7 with a correct timing corresponding to the basic period T during recording. Also, the PLL circuit 53 generates and outputs a playback clock CK with extremely slight jitter.

An EFM demodulation circuit 54 generates playback data by sequentially latching a binarizing signal based on the playback clock CK. Further, this EFM demodulation circuit 54 also demodulates and outputs this playback data. After interleave processing of the playback data output from the EFM demodulation circuit 54, an ECC circuit 55 performs error correction processing and outputs the result.

Figure 13:
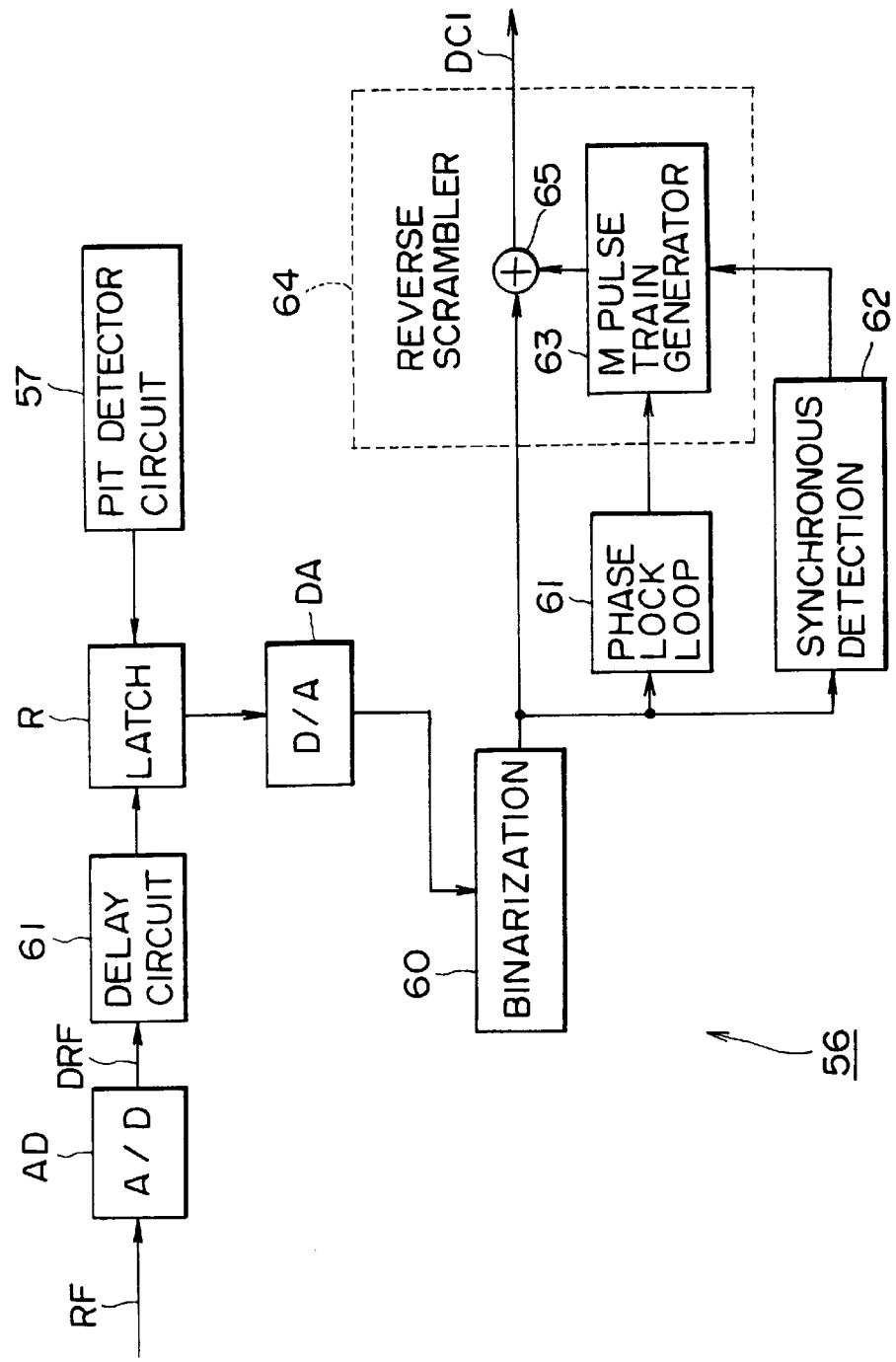
FIG. 13 is a block diagram showing the discriminator code detector of the compact disk player in FIG. 12.

A discriminator code detector 56, detects the identification data from the amplitude of the playback RF signal and outputs this data to the system control circuit 77. In other words, as shown in FIG. 13, the discriminator code detector 56, detects pits with a period from 6T to 11T per the pit detector circuit 57. As shown in FIG. 14, this pit detector circuit 57 inputs a binarizing signal S7 to the 10 stage serially connected latch circuits 57A to 57J and sequentially transfers this binarizing signal S7 by means of the playback clock CK. The AND circuits 58A–58F are set with inverting inputs at the specified input terminals, the latch circuits 57A–57J input the latch outputs, and when the latch circuits 57A–57J are set with a 0 or a 1 to correspond to the respective periods 6T, 7T, 8T, then an output signal of the specified logic level is output. The OR circuit 59 receives the output signals from the AND circuits 58A–58F and outputs the logic sum of the signals. The pit detector circuit 57 can therefore detect a pit length accurately showing the amplitude of the laser beam intensity during forming of the pit.

In the discriminator code detector 56 of FIG. 13, the analog digital (A/D) converter performs analog digital processing of the playback RF signal and then outputs the digital playback signal DRF. A delay circuit 61 serves to delay this digital playback signal DRF and a timing corresponding to the pit detection timing in the pit detector circuit 57 is then output.

A latch circuit R, latches the digital playback signal DRF based on detection results of the pit detector 57 and detects the amplitude of the RF playback signal for pits with a period of 6T or more by the timing for receiving the returning light at approximately the center of each pit. A digital analog converter DA, performs digital analog conversion of the output from the latch circuit R and outputs the result. A binarizing circuit 60 performs binarizing on the output signal from the digital analog converter DA and generates a binarizing signal.

A PLL circuit 61 detects a playback clock pulse from this binarizing signal. A synchronizer detection circuit 62 monitors the signal level of this binarized signal in order to detect the timing of the synchronized signal added by the discriminator code generator 12 of the optical disk device 1, and issues an output. An M pulse train generator 63 is set with the timing detected by means of the synchronizer detection circuit 62 and then sequentially outputs an M pulse train code. Conversely, a reverse scrambler 64 performs logic processing of this M pulse train code and the binarizing signal by means of an adder circuit 65 composed of an exclusive OR circuit and thus demodulates the identification data DC1.

A system controller 77 (FIG. 12) is comprised of a computer for controlling overall system operation of this compact disk player 50. This system controller 77 determines whether or not identification data is correctly detected in the discriminator code detector 56 and on finding that incorrect results were obtained, stops the operation of the digital-analog converter 79. The digital-analog converter 79 here performs digital to analog conversion of the audio data detected by the ECC circuit 55 under control of the system controller 77 and outputs the audio signal SA which is an analog signal.

In the optical disk device 1, configured as described above (FIG. 1, FIG. 9) the compensation data table 29 is set to the initial or default value per the edge position compensators 15A and 15B and an evaluation disk fabricated to the identical conditions as in making a conventional compact disk. A compact disk 41 for evaluation purposes was fabricated from the disk base 2.

In this evaluation compact disk 41, a modulation signal varying at a signal level at a period several times that of the fundamental period T, controls the on and off switching of the laser beam L to sequentially expose the disk base 2 to light and thus record D1 by means of the pit length and pit intervals. Also, the intensity of the laser beam L light is lowered based on this identification data so that discrimination (or identification) data can be recorded by means of the variations in the pit width. Further, varying pit lengths are formed accompanying the variations in this pit width.

The playback signal thus obtained from the evaluation compact disk 41 is observed to have jitter due to interference between codes in adjacent pits in sections where pits were formed with a constant light intensity. Further, in section where the pit width varies, variations in pit length occur in addition to the code interference in adjacent pits so that a large jitter occurs. In this section where the pit width varies, the amplitude of the playback signal also changes and extreme changes in asymmetry occur.

Accordingly, the timing across the slice level varies according to the laser beam intensity during exposure and the varying pattern of the modulation signal corresponding to the shape of the pit and lands, and a large jitter occurs in the playback clock generated by this playback signal.

This compact disk 41 is played back by the compact disk player 42 and after the RF playback signal is observed to have changed into a digital signal on the digital oscilloscope 45, a binarizing signal, EFM demodulation signal and playback clock signal are generated by the computer 44. Also, in the compact disk 41, when the pits and lands are detected by means of the demodulation signal for each edge of the binarizing signal and the varying pattern of the modulation signal is detected; then the amount of jitter over time is measured for each edge of the playback clock pulse When the intensity of the laser beam is raised, and maintained at a fixed value, the results measured over time for each of the varying patterns are set to an average value, and the amount of jitter per each varying pattern due to interference between codes for each laser beam intensity is detected. In the compact disk 41, the detection of the amount of jitter is performed based on calculations for formula (1) based on the tap delay time difference t in the delay circuit 31 (FIG. 9); and a tap position detected for the delay circuit 31 that can cancel out the amount of jitter that is detected. Further, the data for specifying the tap position detected in this compact disk 41 is stored in the Read Only memory as compensation data DF. This allows the jitter compensation units to be set as the tap delay time difference $\tau$ in the delay circuit 31, and a compensation table 29 to be formed.

The compensation data DF for a laser beam intensity of 100 percent is recorded at this time in the compensation table 29 of the edge position compensator 15A, and the compensation data DF for a laser beam intensity of 85 percent is recorded in the compensation table 29 of the edge position compensator 15B.

When the compensation table 29 is formed in this way, the audio data D1 in the optical disk device is subjected to a specific data process and the signal level changes are converted into a modulation signal S2 consisting of fundamental period T as the units. After the signal level of the modulation signal S2 is converted into a TTL level in the edge position compensator 15A (FIG. 7), a clock CK is played back by means of the PLL circuit 27. The 13 stage latch circuit 28A–28M is sequentially latched in the pulse rise edge compensator 25A and pulse fall edge compensator 25B (FIG. 9) and the varying pattern detected.

The modulation signal S2 is input to the monostable multivibrator 30 by means of the latch circuit 28G in the center of the latch circuit 28A–28M. The pulse rise edge compensator 25A triggers the output of the monostable multivibrator 30 on the rising edge timing, and the pulse rise edge compensator 25B triggers the output of the monostable multivibrator 30 on the falling edge timing. So that a signal level rise pulse and a signal level fall pulse are generated at the respective timings for the rising edge and the falling edge.

These rise pulse signal and fall pulse signals in the delay circuit 31 in the pulse rise edge compensators 25A and 25B are respectively delayed in units of delay time t utilized in calculating the compensation data DF. The tap outputs of the delay circuit 31 are output to the selector 33. The varying pattern of the modulation signal S2 however is detected with the latch circuits 28A–28M and the corresponding compensation data DF detected by accessing the compensation table 29 addressed at the latch circuit 28A–28M output. The contact points of the selector 33 are then switched according to the compensation data DF.

In this process, when a laser beam intensity of 100 percent is detected on the evaluation compact disk 41 by means of the selector 33 in the pulse rise edge compensators 25A and 25B then, in order to correct the jitter, a rising edge signal SS and a falling edge signal SR are output to compensate the respective edge timings of the rising edge and the falling edge of the modulation signal S2. This rising edge signal SS and a falling edge signal SR are combined in the flip flop 35 as shown in FIG. 7.

Further, the signal S5 output from the flipflop 35 is corrected by the signal level from the level inversion converter 36 so that the evaluation compact disk 41 is detected and when the laser beam output is 100 percent, the edge timing of the modulation signal S2 is corrected and an modulation signal S1A is generated so that jitter is corrected or in other words so that interference between codes is reduced.

In the same way, the varying pattern of the modulation signal S2 is detected in the edge position compensator 15B. A rising edge signal SS and a falling edge signal SR are generated by the compensation data DF that corresponds to this varying pattern. The rising edge signal SS and a falling edge signal SR are then combined by the flipflop 35. The modulation signal S2 can therefore be corrected for jitter in the edge position compensator 15B, when the laser beam L has an intensity of 85 percent as detected when irradiated onto the compact disk 41. In other words, the variations in pit length that accompany a drop in the laser beam intensity can be canceled out and the interference within codes reduced, by correcting the timing of the modulation signal S2 and which is then generated as modulation signal S1B.

In contrast, in the optical disk device 1, a synchronizing signal and identification data are sequentially output by the discriminator table 20 (FIG. 6). This data is encoded as an M pulse train code in the scramble circuit 21. This encoded identification data is then input to a light modulator 8A (FIG. 1) by means of a control signal SC1. Thus in the optical disk device 1, the laser beam L intensity is switched from 100 percent to 85 percent according to the identification data. This switching of the light intensity means that identification data can be recorded on the disk base 2 as variations in pit width.

In the data selector 13 at this time, triggered by the switching of the laser beam intensity, the modulation signals S1A and S1B output from the edge position compensators 15A and 15B are selectively input to the light modulator 8B. The audio data D1 is thus recorded as pit lengths and pit intervals on the disk base 2 and the timing of the light exposure corrected in order to prevent variations in pit length that accompany changes in pit length in response to this identification data. This light exposure timing is also corrected in order to reduce interference within codes in pits due to adjacent pits.

When this disk base 2 is exposed to light as above, a compact disk H is formed from this disk base 2. This compact disk H is then played back by means of a compact disk player 50 (in FIG. 12). In this compact disk H order to reduce interference within codes from adjacent pits that occurs in the audio data D1, the front edge and rear edge positions are corrected according to the pattern combination with adjacent pits and recording performed by means of the pit length and pit interval. Further, the encoded identification data is recorded by means of variations in pit width and the front and rear edge positions are corrected so that for the audio data D1, the variations in pit length occurring due to variations in pit width are canceled out.

In this compact disk player 50 an RF playback signal is detected whose signal level varies according to the light intensity of the light returning from the compact disk H manufactured as described above. This RF playback signal is sliced to a specified slice level in the binarizing circuit 52 and converted to a binarizing signal S7. Further, a playback clock pulse CK is produced in the PLL circuit 53 based on this binarizing signal S7 and in the EFM demodulation circuit 54, after generating playback data from sequential latching of the binarizing signal S7 by this playback clock pulse CK, demodulation is performed. Further, the playback data is subjected to interleave processing in the ECC circuit 55, error correction performed and the data converted to an analog signal and output.

In this process, the playback signal for the compact disk H of this embodiment is binarized with a fixed slice level SL to generate a binarizing signal of the correct timing by correcting the positions of the front and rear edge positions so that pit length variations due to variations in the pit width are canceled out. In other words, jitter which accompanies switching of the light intensity, can be effectively avoided in the playback clock CK pulse and a binarizing signal issued. Further, interference within codes can be reduced by correcting the edge positions so that both jitter and interference within codes are reduced. Therefore the audio data can be correctly played back regardless of whether variations in the pit width have occurred.

A binarizing signal S7 is input to the discriminator code detector 56 along with the playback signal RF and the playback clock pulse CK. Here, identification data recorded by means of variations in the pit width is played back. In other words, in the discriminator code detector 56 of FIG. 13, a pit timing of a period of 6T or more of the binarizing signal S7 is detected in the pit detector 57 and the signal level of the latch circuit R detected by means of this timing. This signal level is further checked by a binarizing circuit 60 and encoded identification data is played back. The clock of this identification data is played back in the PLL circuit 61 and based on this clock, the encoded data is decoded by M pulse train data.

In the compact disk player 50, the system controller 77 determines whether or not the compact disk H is the genuine product or not, by whether this identification data was played back correctly. In the genuine compact disk, an audio signal SA is output from the digital-analog converter 79 but in a copy there is no output of the audio signal SA.

In other words, in a compact disk copy, made by recording the audio data D1 and then played back in this kind of compact disk player 50, controlling the pit width and recording of the identification data will also be difficult so consequently playback of the identification data will also be difficult or impossible. Further, because the identification data is itself encoded, trying to decipher or decode this data also proves difficult or impossible. Therefore such copies cannot be played back correctly on the compact disk player 50 and will be not be wanted on the market.

In cases where compact disk copies are attempted by physically copying the pit shape from the genuine compact disk H, physical variations in the bit shape will prove an unavoidable obstacle, making it difficult or impossible to faithfully reproduce the corrected edge position or the variations in the pit width. Thus, in this kind of compact disk copy, the signal level of the binarizing signal S7 will not vary with the correct timing obtained after binarizing of the RF playback signal, and jitter will occur by this amount in the playback clock pulse CK, also bit errors will occur in the playback data that will prove impossible to correct. Consequently, this kind of compact disk copy will prove difficult or impossible to playback in the compact disk player 50. Since making a correct copy by copying the pit width is extremely difficult, the compact disk player will be unable to correctly detect the identification data and playback will be difficult or impossible to perform.

In the above described configuration of this invention, along with recording the audio data D1 which comprises the main data, by means of pit length and pit intervals, encoding the compact disk identification data and recording this data by means of the pit width makes identification of illegal copies easy and makes playback of the illegal copy difficult so that illegal copies of this type can be eliminated from the market.

Further, by correcting the edge position of each bit by compensating for the variations in pit length that accompany the pit width at this time and by reducing interference within codes due to adjacent bits, the audio data can be reliably played back even when the necessary data has been recorded at a high density. Thus illegal copies can definitely be prevented and illegal copies of this type excluded from the market.

The signal level of the playback signal in pits with a period of 6T or more is selectively detected and by playback of identification data recorded by means of pit width, signal level variations that accompany changed in pit width can be reliably detected and the identification data played back correctly.

This embodiment described a method where the width of the pit for recording the audio data was changed when recording identification data however this invention is not limited to this method and may also utilize recording of identification data in which recording of the identification data changes the pit width for recording of TOC data in the lead in area.

This embodiment described a method where identification data was encoded from the pit width however this invention is not limited to this method and may also as necessary, record the identification data directly without performing encoding. Recording may also, along with the pit width, utilize the coded data used in the encoding of the identification data.

Further, this embodiment described a method where the audio data was simply codified or signed and recorded, however this invention is not limited to this method and may also utilize recording of encoded audio data and in such cases the recording may utilize the pit width along with the codified or signed data used in the encoding.

Still further, this embodiment described a method where the pit width was recorded on the identification data of the optical disk along with data such as manufacturing locations, however this invention is not limited to this method and may be widely applied such as in a method for recording pit width data separately or along with this data for recording the name of the intellectual product and, may record identification data such as regarding the manufacturer separately or together with the pit width.

Yet further, this embodiment described a method where the signal level of the playback signal was detected when the bit period was 6T or more, however this invention is not limited to this method and may be applied to identify variations in pit width. Detection of the signal level of the playback signal may also be used for pits other than described here. Further, conversely, a method may be employed for instance, that detects the signal level of the playback signal just for pits of a particular period whose pit width varies markedly due to physical copying.

This embodiment also described a method where light intensity of the laser beam was switched by means of a sufficiently long time interval for a continuous pit row, however this invention is not limited to this method and when identifying variation in pit width may switch the light intensity of the laser beam for just particular pits and thus for instance, may also modulate the pit width by switching the light intensity of the laser beam for consecutive pits.

This embodiment further described a method where the pit width was modulated by switching the light intensity of the laser beam in two steps, however this invention is not limited to this method and may also modulate the pit width by switching the light intensity of the laser beam in a plurality of steps when identifying variations in pit width.

Figure 15:
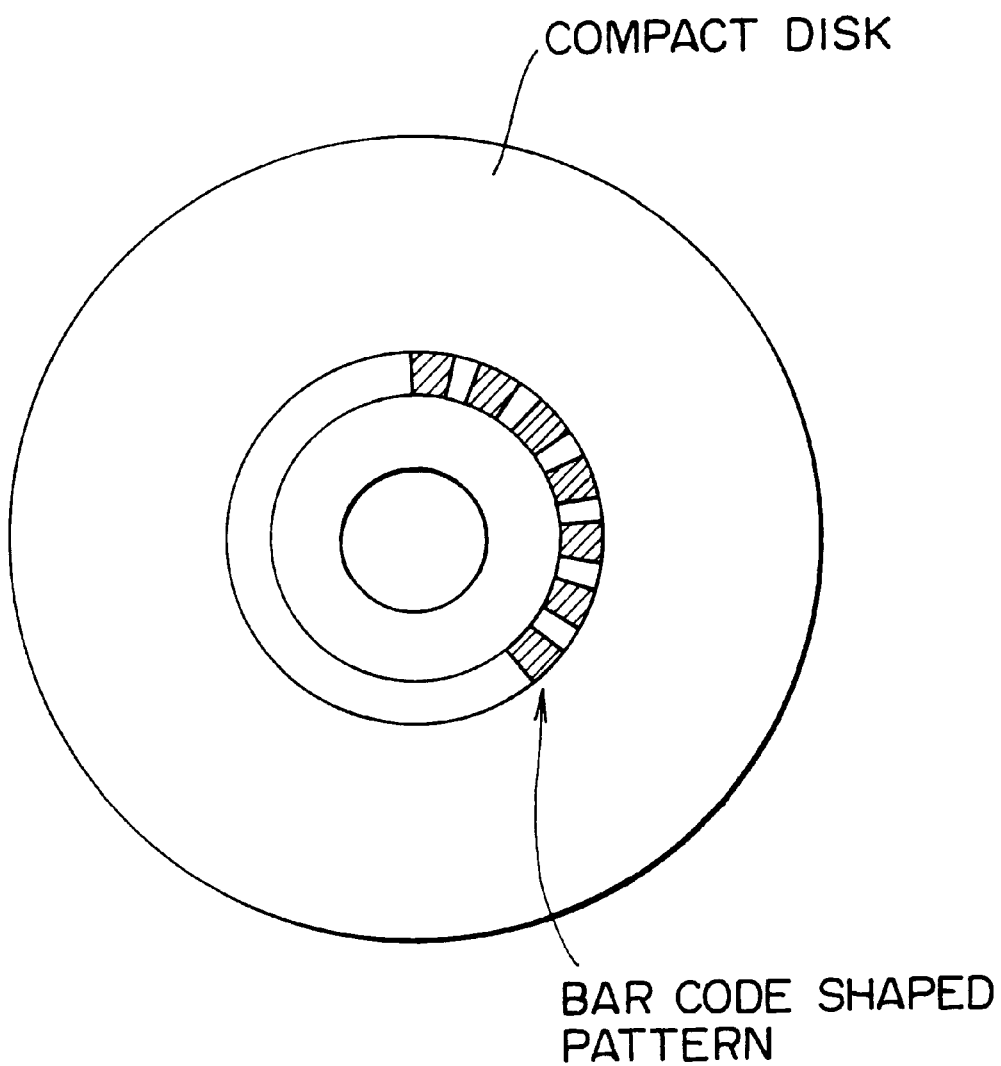
FIG. 15 is a flat view showing the compact disk player relating to another embodiment.

In this embodiment a method was also described where repetitive recording of identification data was performed by simply varying the pit width, however this invention is not limited to this method and may also implement recording of identification data per changes in pit width just for a specified zone according to the laser beam irradiation position. In such a case, if for instance recording identification data by variations in pit width with timing synchronized with the rotation of the compact disk, then as shown in FIG. 15, a bar code shaped pattern can be formed that radiates outwards on the reflective surface of the compact disk. A visual determination can then be made as to whether the disk is an illegal copy or not. A pattern such as containing the manufacturer's name may also be formed on the reflective surface.

A method is also described in this embodiment for determining whether a copy is an illegal copy or not according to whether or not the identification data is played back correctly, however this invention is not limited to this method and may also for instance determine if a copy is illegal by comparing with other identification data recorded in the lead in area by means of the pit length and pit forming period, or further by recording against encoded identification data such as other pulse codified data by the pit width to determine if the copy is illegal or not. This invention is widely applicable to various method for determining if a copy is illegal or not, based on the identification data.

Further, this embodiment described fabricating an optical disk that directly utilized a compensation table created by means of an evaluation optical disk, however this invention is not limited to this method and may also for instance utilize a method in which an evaluation optical disk is fabricated utilizing a compensation table made using an evaluation optical disk and the compensation table corrected by means of this additionally fabricated evaluation optical disk. If the compensation table is repeatedly corrected, then the amount of jitter will be reduced by an amount equal to the improvement in the compensation table.

This embodiment also describes the detection of a varying pattern by means of thirteen samplings of the modulation signal, however this invention is not limited to this method and may also increase the number of samplings as needed and thus be able to handle long recording information patterns.

Still further, this embodiment described the measurement of the jitter amount per time measurement of binarizing signal based on the fundamental period and then generating correction data from the results of these measurements, however this invention is not limited to this method and when sufficient accuracy can be maintained, may substitute the generation of compensation data obtained by detecting the signal level of the playback signal based on the basic clock pulse instead of the above method of measuring the jitter amount over time. When such a method (compensation data) is used, the differential voltage from the detected signal level of the playback signal to the slice level is calculated, and the compensation data then calculated from the excess response characteristics of the playback signal and this differential voltage.

Yet further, this embodiment described correcting the timing of the modulation signal according to the compensation data formed in the table, however this invention is not limited to this method and when sufficient accuracy can be maintained, may substitute this compensation data detected beforehand, instead with a method for calculation of compensation data by arithmetical processing and then using this compensation data to correct the timing of the modulation signal.

Even still further, this embodiment described calculation of the compensation data by means of an evaluation optical disk, however this invention is not limited to this and when for instance applied to a Write Once type optical disk device, may calculate the compensation data based on test writing results in the so called test writing zone.

This embodiment also described this invention as applied to optical disks, however this invention is not limited to this method and can also be widely applied as for instance to optical disk devices for recording various types of data by means of pits or further, to optical disk devices for recording various types of data by means of marks as applicable to thermo-magnetic recording techniques. Incidentally, this embodiment is also widely applicable in optical disk devices recording various types of data as multiple-value data by means of disparities in excess response characteristic of the playback signal.

This invention configured as described above effectively prevents illegal copying by controlling the laser beam irradiation timing and laser beam intensity by recording the main data by the length of pits or marks formed and by recording the identification data which comprises the secondary data, by means of the pit width.

What is claimed is:

1. An optical information recording device for irradiating an optical recording medium with a laser beam and forming pits or marks on said optical recording medium based on a specified modulation signal for preventing unauthorized copying of said optical recording medium, said device comprising:

modulation signal generating means to generate said modulation signal for switching a signal level based on a period that is an integral multiple of a specified fundamental period; and switching means for switching a laser beam intensity in response to a specified secondary data, wherein said secondary data is formed as part of an identification data for said optical recording medium.

2. An optical information recording device according to claim 1, wherein said switching means encodes auxiliary data and switches said laser beam intensity according to an encoded data train.

3. An optical information recording device according to claim 1, wherein said modulation signal generating means includes timing correction means to compensate a timing of said modulation signal so that a binarizing signal is varied based on said fundamental period during generation of said binarizing signal when a signal obtained from said optical recording medium is binarized at a specified slice level.

4. An optical information recording device according to claim 3, wherein said timing correction means corrects said timing of said modulation signal in response to changing patterns of said modulation signal.

5. An optical disk device according to claim 3, wherein said timing correction means corrects said timing of said modulation signal according to correction data stored in correction data storage means and said correction data is set based on playback results of said optical recording medium.

6. An optical disk device according to claim 3, wherein at least two types of correction data are used to synchronously switch said laser beam intensity output from said switching means.

7. An optical information recording device according to claim 1, wherein said optical information recording medium is an optical disk and said optical information recording device drives and rotates said optical disk to sequentially form said pits or marks, and said switching means switches said laser beam intensity.

8. An optical information playback device for playing back data recorded on an optical recording medium based on reflected light obtained from irradiating a laser beam onto said recording medium, said device comprising:

an optical playback medium for receiving said reflected light and outputting a playback signal level which varies in response to pits or marks formed on said optical recording medium;

first playback signal processing means for receiving said playback signal and outputting a main playback data corresponding to a determination of said playback signal level based on a specified threshold value;

second playback signal processing means for receiving said playback signal and outputting a secondary playback data corresponding to an amplitude modulated value of said playback signal;

playback processing means for stopping processing of said main playback data based on said secondary playback data.

9. An optical information playback device according to claim 8, wherein said second playback signal processing means selectively detects said amplitude modulated value of said playback signal and generates said secondary playback data for pits and marks of specified length on said optical recording medium.

10. An optical information playback device according to claim 8, wherein said second playback signal processing means selectively detects said amplitude modulated value of said playback signal and generates said secondary playback data at a timing which matches said reflected light obtained from an approximate center of said pits and marks.

11. An optical information recording medium formed with pits or marks on an information recording surface based on a specified fundamental period, comprising:

main data recorded based on lengths and intervals of said pits or marks on said information recording surface; and secondary data recorded based on a width of said pits and marks, said secondary data being identification data.

12. An optical information recording medium according to claim 11, wherein longitudinal edges of said pits or marks are corrected to match said width of said pits or marks.

13. An optical information recording medium according to claim 11, wherein said secondary data is encoded and recorded.

14. An optical information recording medium, comprising:

a first zone in which a width of pits or marks formed in said recording medium is set to a first width; and a second zone in which a width of pits or marks formed in said recording medium is set to a second width, wherein said first and second widths are set to be visually discriminated.

* * * * *